United States Patent
Oh et al.

(10) Patent No.: US 6,704,793 B1
(45) Date of Patent: Mar. 9, 2004

(54) DATA TRANSMISSION PROTOCOL IN IMAGE COMMUNICATION DEVICE

(75) Inventors: Hyung Hoon Oh, Seoul (KR); Byong Khi Oh, Seoul (KR); Jun Seon Kim, Seoul (KR); Sung June Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/451,765

(22) Filed: Dec. 1, 1999

(30) Foreign Application Priority Data

Dec. 2, 1998 (KR) .......................... 1998-52488

(51) Int. Cl.[7] .............................................. G06F 13/00
(52) U.S. Cl. ...................... 709/236; 709/231; 709/246; 710/30
(58) Field of Search ................................ 709/230, 231, 709/236, 245, 246, 313; 707/100, 101, 104; 710/29, 30, 32, 33

(56) References Cited

U.S. PATENT DOCUMENTS

| | | | | |
|---|---|---|---|---|
| 5,010,514 A | * | 4/1991 | Kippenhan et al. | |
| 5,862,153 A | * | 1/1999 | Kikuchi et al. | ................ 371/42 |
| 5,911,044 A | * | 6/1999 | Lo et al. | ...................... 709/203 |
| 6,215,789 B1 | * | 4/2001 | Keenan et al. | ............... 370/399 |
| 6,253,025 B1 | * | 6/2001 | Kitamura et al. | ............ 386/125 |
| 6,415,135 B1 | * | 7/2002 | Salomaki | ..................... 455/45 |

* cited by examiner

*Primary Examiner*—Viet D. Vu
(74) *Attorney, Agent, or Firm*—Birch, Stewart, Kolasch & Birch, LLP

(57) ABSTRACT

A data transmission protocol for reducing the MODEM connection time in an image communication is provided by the structure of a flag for informing of a start of a file, header information for discriminating a nature of data information, flag data address information which contains address information corresponding to flag data of the data information, data information, and a flag for informing of a completion of the file.

17 Claims, 5 Drawing Sheets

FIG.1
Related Art
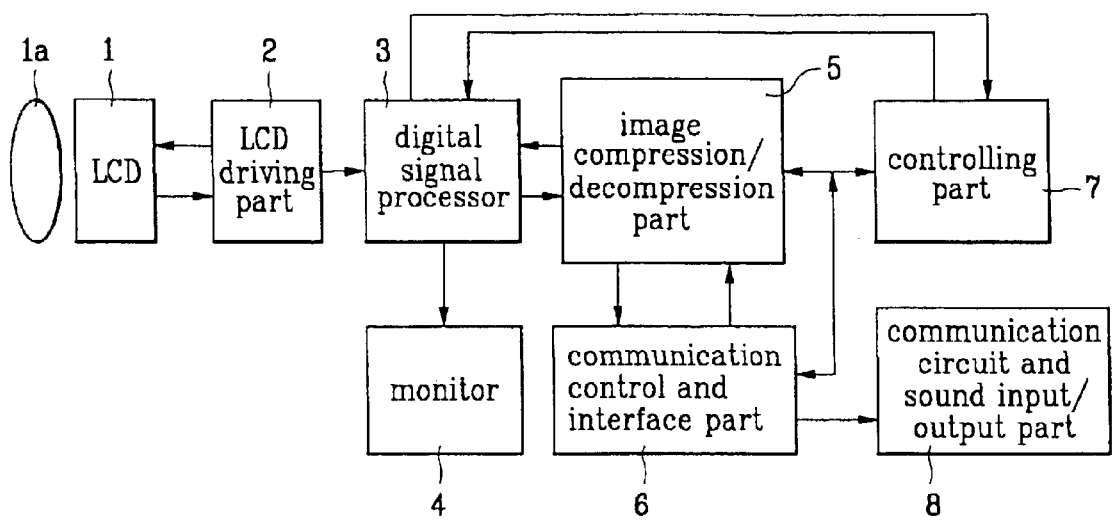
FIG.2
Related Art
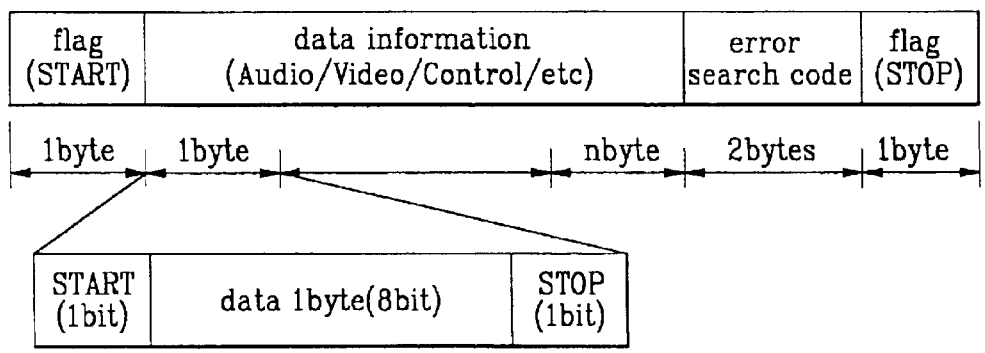
FIG.3
Related Art
| data information(Audio/Video/Control/etc) |

In case of control data retransmission requirement

In case of no required retransmission data

DATA TRANSMISSION PROTOCOL IN IMAGE COMMUNICATION DEVICE

BACKGROUND OF THE INVENTION

1. Field of the Invention

The present invention relates to an image communication device, and more particularly, to a data transmission protocol in an image communication device.

2. Discussion of Related Art

An image communication device based on a conventional technique is described referring to the accompanied drawings, as follows.

FIG. 1 represents a block diagram of an image communication device. The image communication device is composed of a semiconductor optical element such as a CCD (Charge Coupled Device) 1 for converting light inputted from the outside through a lens 1a into an electric image signal, a CCD driving part 2 for transferring the image signal inputted through the CCD 1 to a digital signal processor (DSP) 3, the digital signal processor 3 for performing a digital signal process on the image signal inputted from the CCD driving part 2, displaying and outputting the processed signal through a monitor 4, and outputting the processed signal as a format of a luminance signal and a color signal for the sake of a compression of the image, an image compression/decompression part 5 for compressing and decompressing the inputted image signals, a communication control and interface part 6 for executing a communication with a communication circuit and sound input/output part 8 in order to transmit the compressed image signal and receive the transmitted image signal, and a controlling part 7 for controlling the respective parts of the system to perform a process, a compression and decompression, a transmission, etc. of the image signals.

FIG. 2 sets forth a frame structure showing a data communication method which uses an HDLC(High-Level Data Link Control) way. This frame structure is made up of a start flag for informing of a start of a file, data information, e.g., audio/video/control/etc., a CRC(Cycle Redundancy Check) code as an error search code, and a stop flag for informing of a completion of the file.

FIG. 3 shows a frame structure of the data information based on a conventional non-protocol method.

Describing the image communication device based on the conventional technique with such construction in detail, referring to the accompanied drawings, outside light inputted through the lens 1a is converted into an electric image signal through the CCD 1, and is inputted to the CCD driving part 2. The CCD driving part 2 performs an analog signal correction for the image signal to make the signal a constant level, and outputs it to the DSP 3.

The DSP 3 executes a clamp, an RGB color control, a lightness control etc., for the inputted image signal, and then, displays the inputted image on the monitor 4.

At this time, the DSP 3 converts the inputted image into a constant format of a luminance signal and a color signal to gain an image compression in order for its transmission to the outside, and outputs it to the image compression/decompression part 5.

The image compression/decompression part 5 performs the image compression by the JPEG(Joint Photographic Coding Experts Group) and the MPEG(Moving Picture Experts Group) according to a kind of the inputted image signals, and such compressed image signal is transmitted to the communication circuit and sound input/output part 8 through the communication control and interface part 6.

A flow of this signal is controlled by the controlling part 7.

As the data communication method using a MODEM as the communication control and interface part 6 in such image communication device, there are an HDLC(High-Level Data Link Control) method and a non-protocol method, and the HDLC method is mainly used.

FIG. 2 provides a frame structure showing a data communication method which uses the HDLC way, and this frame structure includes a start flag for informing of a start of a file, data information, e.g., audio/video/control/etc., a CRC code as an error search code, and a stop flag for informing of a completion. In the HDLC structure, a flag pattern of the start and stop flags, '01111110($7E_{HEC}$)', has a writing by a combination of 8 bit, wherein the start and stop flags are to inform of a start and a completion of a file for the sake of a synchronization of the frame.

That is, the flag synchronizing system is to send a code of a constant pattern and always attain a synchronization between the transmission and the reception even though there is no transmission data, and this constant pattern is as the flag pattern '01111110($7E_{HEC}$)', the $7E_{HEC}$ being a hexadecimal.

The MODEM of a receiving side which receives this flag, transfers the flag to the controlling part, CPU, under a removal state of the start and stop flags.

Data information sent, next to the start flag, contains optional bytes such as audio/video/control/etc. and is sent. Data 1 byte is herewith provided by a structure of 8 bit, and both ends of this 8 bit have each additional 1 bit as a start bit and a stop bit, thus 10 bit is transmitted.

The data information itself contains a CRC code in order to search the respective data such as the audio/video/control etc.

Six Data '1s' in the above data stream are limited to the flag (01111110). Therefore, when one data information to be sent needs over six consecutive '1s', '0' is compulsorily added next to fifth '1' as a zero insert, so that it is definitely divided with the start and stop flags. Then, the receiving side removes '0' positioned next to the fifth '1' of the consecutive '1s'.

The CRC code, namely an error searching code, is provided next to this data stream, and this is as a combination of 16 bit and checks an existence or non-existence of an error for a part excepting the start and stop flags.

In such HDLC method, however, it is the state that the CRC code for a search of an error is already made in the data information such as the audio/video/control/etc., and that the repeated CRC code is then provided by using a MODEM line, to accordingly cause an overhead by an extent of a CRC code.

Further, a large overhead by data 1 byte, namely 10 bit, is transmitted to transmit the data 1 byte though data 1 byte is 8 bit, since each 1 bit as the start and stop bit is added in a data transmission. Consequently, a loss of a data quantity per communication second becomes large and its size also becomes increase.

Furthermore, when over six '1s' among data of the data information are consecutive, '0' is compulsively added next to a fifth '1' to prevent a restriction to the flag. In other words, '0' is inserted in order to prevent an existence of data same as the start and stop flags. Thus, an overhead of the data information owing to an insertion of '0' and a complication to again eliminate '0' by the receiving side are increased.

In the non-protocol method, meantime, as shown in FIG. 3, its structure is to directly transmit and receive sending data with only a data stream.

Then, the receiving side previously decides with a transmitting side a mutual protocol for a file division of an audio, a video, a control, etc. among the transmitted data information, and after that, a transmission from its protocol is performed, namely the protocol transmission for a 'video:control=3:2' etc. is executed. The receiving side has a difficulty in distinguishing it, and also, in a case of changing the transmission protocol and transmitting it within a given quantity, a newly dividing work is required every its each case.

Additionally, in the HDLC method mainly used as the conventional transmission method, several search codes of the data information and error search codes added in the MODEM transmission are repeated, thus an overhead by its added quantity occurs. Further, the overhead for the 1 byte data, the data loss and the size increase are caused, since the start and stop bits are added to the data 1 byte by each 1 bit. In addition, there are complicated problems such as the overhead caused due to a compulsive addition of '0' to the data information restricted to the flag, and its data removal performed by the receiving side, and there is a difficulty for distinguishing each data information by the receiving side.

SUMMARY OF THE INVENTION

Accordingly, the present invention is directed to a data transmission protocol of an image communication device that substantially obviate one or more of the limitations and disadvantages of the related art.

An object of the present invention is to provide a data transmission protocol of an image communication device, in which a transmission efficiency per unit time is heightened by eliminating overhead data in transmitting data through a MODEM, and a receiving side can easily execute a search of mutually different files/data packets to shorten a MODEM connection time.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, the data transmission protocol of an image communication device transmits data under the structure of a flag for informing of a start of a file, header information for discriminating a nature of data information, flag data address information which contains address information corresponding to flag data of the data information, data information which contains the rest data excepting the flag data, and a flag for informing of a completion of the file.

The inventive data transmission protocol has another characteristic that in the flag for informing of the start and the completion, a flag pattern for the sake of a distinction between files is selected as one out of digits larger than '1000000($80_{HEC}$)', the flag pattern being as a combination of 8 bits.

In the flag for informing of the start and the completion according to the inventive protocol, a data usage range can be freely in "0~7F" by using '10000001($81_{HEC}$)' as a larger digit $128_{DEC}$.

In the header information for the inventive other characteristic, 8 bit is combined to distinct a nature of data as the audio/video/control/user/etc., and data is respectively represented as mutually different codes in order for an easy recognition of each data. Also, in a case of a transmission of the data information based on the same nature, a characteristic of files for the respective data information is subdivided and the data is transmitted by mutually different codes.

In the header information according to the inventive characteristic, 8 bit of the mutually different codes is combined so as to easily distinguish a nature of the mutually different data and files' characteristic of the same data, and its codes can be respectively designated among digits larger than $80_{HEC}$.

In the flag data address information according to the inventive characteristic, in case that there is data same as the flag data among data of the data information, an address pointer for its respective data is combined by 8 bit to attain consecutively optional bytes.

In the flag data address information according to the inventive characteristic, in case that there is data same as '10000001' among data of the data information, an address pointer for its respective data is combined by 8 bit to gain consecutively optional bytes.

In the data information according to the inventive characteristic, only the rest data excepting the data same as the flag data is sent.

In the data information according to the inventive characteristic, only the rest data excepting the data same as the flag data '10000001' is transmitted, and if positional information of the respective data is over '01111111($7F_{HEC}$)' as a threshold, an identifier as '11110000($F0_{HEC}$)' is put, and next, a based value as '1000000($80_{HEC}$)' is put. If it is over the based value, the identifier is put on that position again by one time to ensure the maximum value.

In one embodiment, the data 1 byte of the data information is transmitted as data combined by 8 bit in the non-protocol system.

In a frame structure according to the inventive characteristic, if the data information is the same data as the audio, the video, the control or a user, flag address length information is added between the header information and boundary identification positional information, wherein the flag address length information represents a length of the boundary identification positional information positioned in a data stream by a combination of 8 bits.

In a frame structure according to the inventive characteristic, packet positional information represented as a combination of 8 bits is added between the header information and the boundary identification information length so as to easily search a position of a packet.

In a frame structure according to the inventive characteristic, in case a receiving side requires a re-transmission of the same data, an area between the flags for informing of the start and the completion is provided with the header information which indicates only the required data.

In a frame structure according to the inventive characteristic, in case there is no corresponding data when a transmitting side received a re-transmission demand, an area between the flags for informing of the start and the completion is provided with the header information which indicates information concerned with no-data.

In the inventive frame structure to transmit data, the start and stop flags are defined as digits larger than 128, the header information capable of identifying a nature of data information is provided next to the start flag, the flag data address information is provided next to the header information to successively write address pointers of data restricted to the flag, and data information containing the rest data except data same as the flag is transmitted next to the flag data address information. Meantime, in case that the same data information is transmitted, the header information is more subdivided, a length of the flag data address information and the packet positional information are added so that the receiving side executes more easily the data information search, and overhead data added in the MODEM is eliminated to thereby heighten a transmission efficiency of data per unit time.

Other objects, characteristics and advantages of the invention may be clarified by a detailed description of the preferred embodiments referred to the accompanied drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 represents a block diagram of a general image communication device;

FIG. 2 sets forth a frame structure of data information based on an HDLC method in a conventional MODEM data transmission;

FIG. 3 indicates a frame structure of data information in a conventional non-protocol method;

FIG. 4 provides a frame structure of a data transmission protocol in an image communication device in accordance with the present invention;

Figure 7:
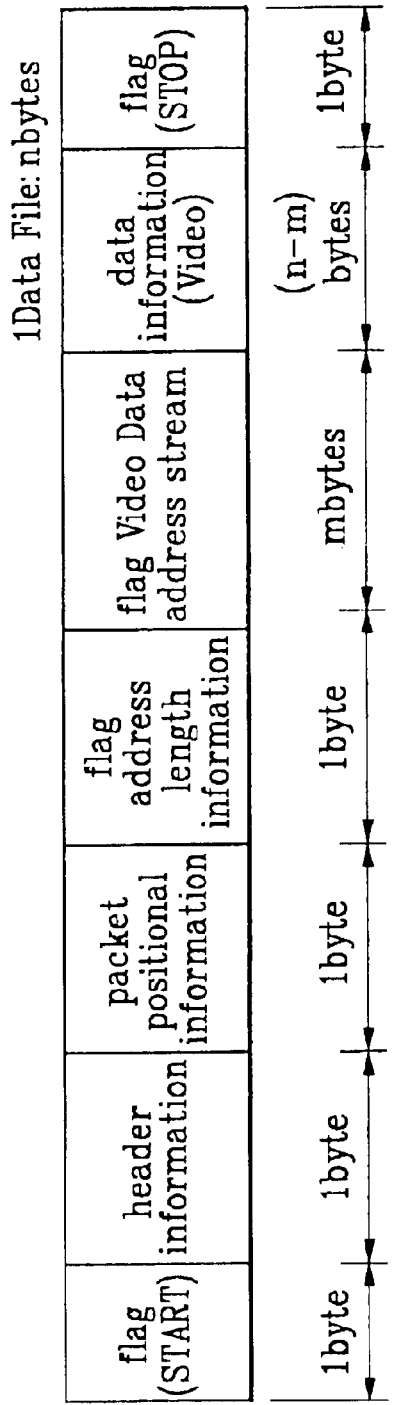
Figure 9:
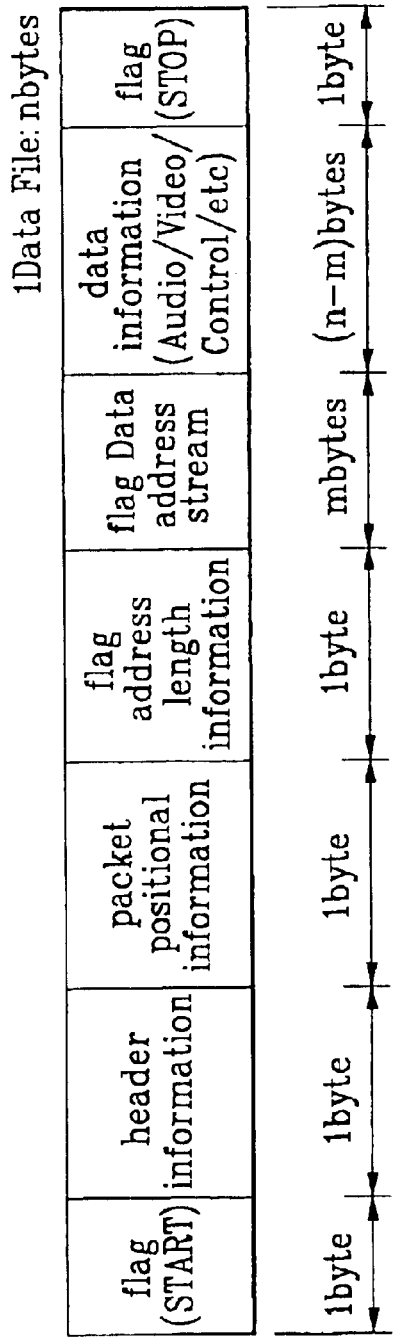
Figure 8:
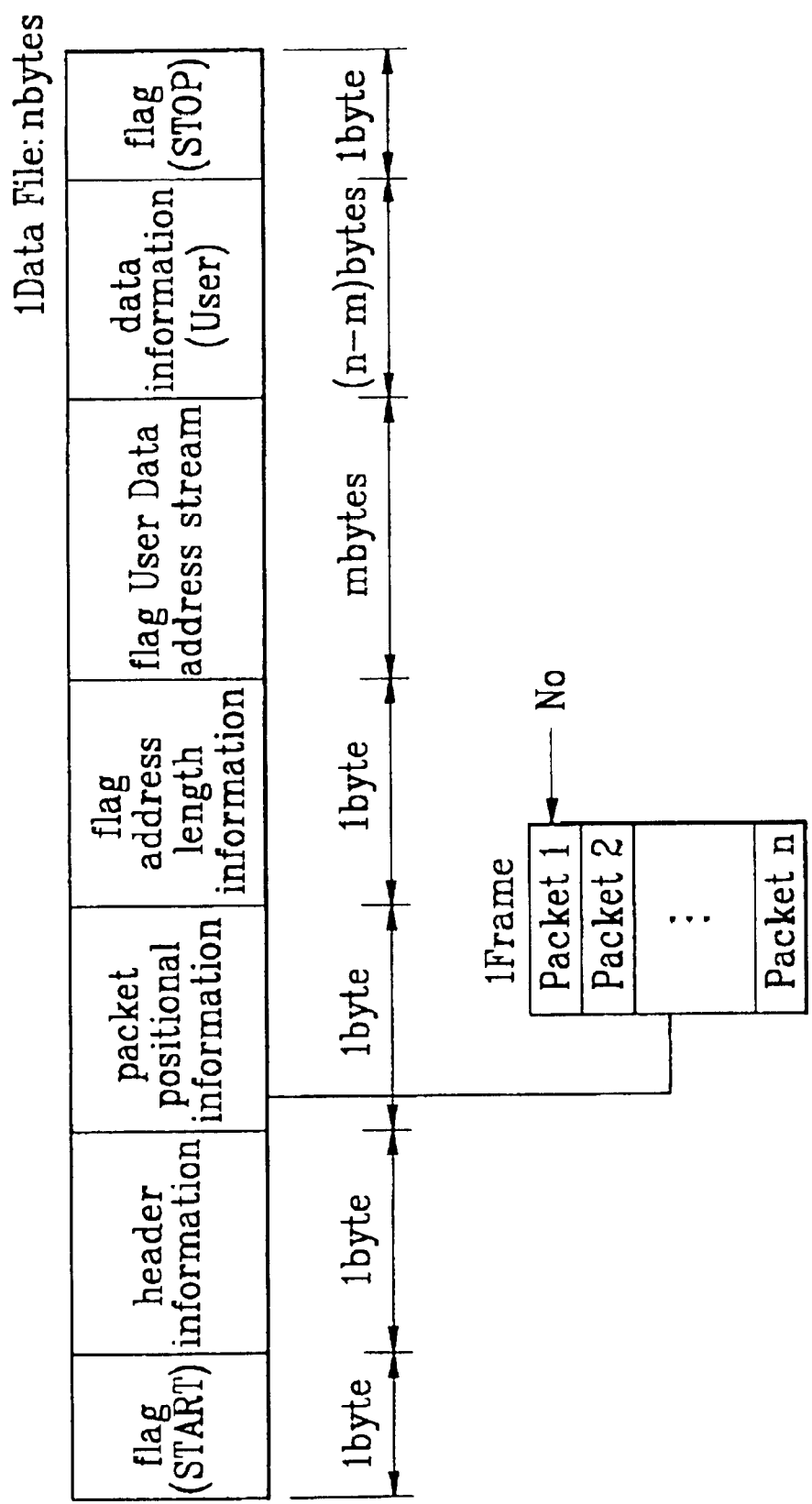
Figure 10A:
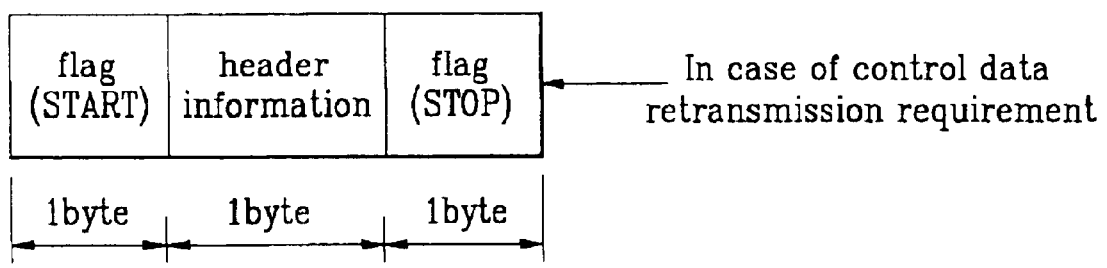
Figure 10B:
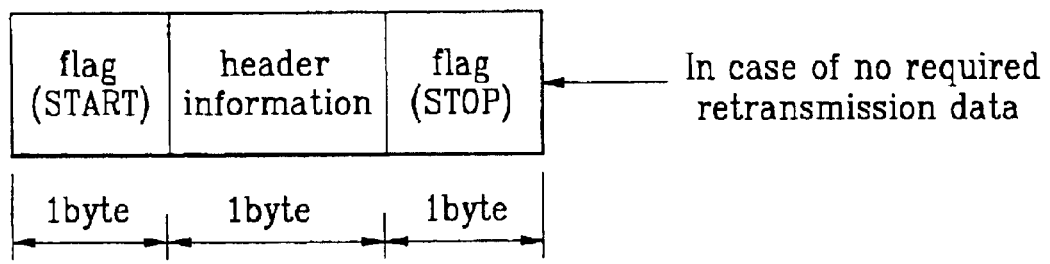

FIG. 7 offers a frame structure of a video data stream in an embodiment of the invention;

FIG. 8 furnishes a frame structure of a user data stream in an inventive embodiment;

FIG. 9 provides a frame structure of a file re-transmission data stream in an embodiment of the present invention;

FIG. 10a represents a frame structure provided when a receiving side requires a re-transmission of data information, in an inventive embodiment; and FIG 10b shows a frame structure provided in case there is no data to be sent, when a transmitting side received a retransmission requirement of data.

DETAILED DESCRIPTION OF THE PREFERRED EMBODIMENTS

Reference will now be made in detail to the preferred embodiments of the present invention, examples of which are illustrated in the accompanying drawings.

Figure 4:
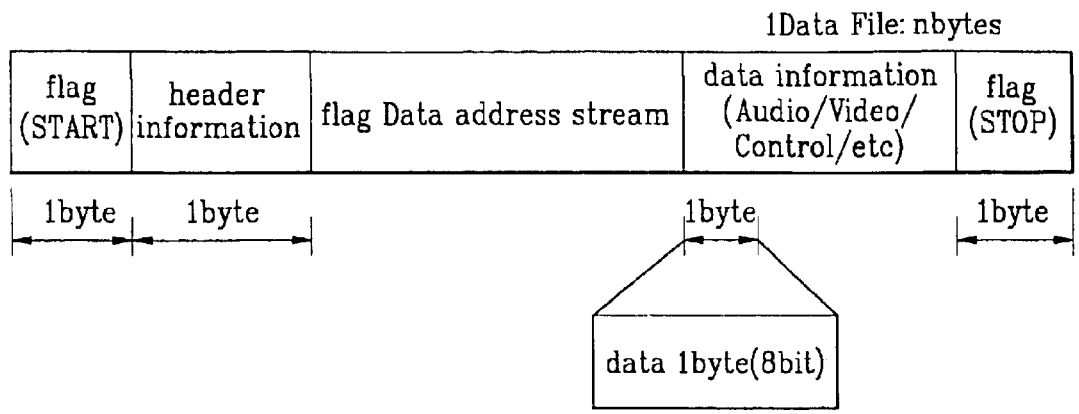

FIG. 4 shows a stream structure of a data transmission protocol in an image communication device in accordance with the present invention, and this frame structure is composed of a start flag for informing of a start of a file, header information for discriminating a nature of data information such as audio/video/control/etc., flag data address stream which contains address information corresponding to flag data of the data information, data information, e.g., the audio/video/control, etc., and a stop flag for informing of a completion of the file.

In the start and stop flags for informing of the start and the completion, a flag pattern based on a combination of 8 bits for the sake of a distinction between files is selected from digits larger than $128_{DEC}$, and its flag data is as '10000001 $(81_{HEC})$', wherein the DEC is a decimal digit and the HEC is a hexadecimal digit.

In the header information, 8 bit is combined to distinct a nature of data, e.g., the audio/video/control etc., and the data is respectively represented as mutually different codes in order for an easy recognition of each data.

In the flag data address stream, in case that there is data same as the flag data '10000001' among data of the data information such as the audio/video/control/etc., an address pointer for its respective data is combined by 8 bit, and the respective data by the address pointers is consecutively arranged in a row.

In the data information as the audio/video/control/etc., only the rest data excepting the data same as the flag data '10000001' is sent, and if positional information of the respective data is over '01111111($7F_{HEC}$)' as a threshold, an identifier as '01111111($F0_{HEC}$)' is put, and next, a based value as '1000000($80_{HEC}$)' is put to ensure the maximum value by a carry.

Further, the data 1 byte of the data information is transmitted with only 8 bit data in a non-protocol system.

Figure 5:
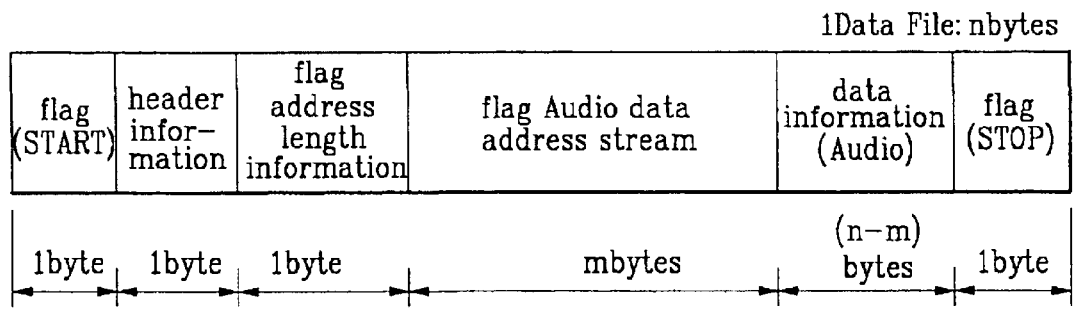
FIG. 5 depicts a frame structure of an audio data stream in an inventive embodiment.
Figure 6:
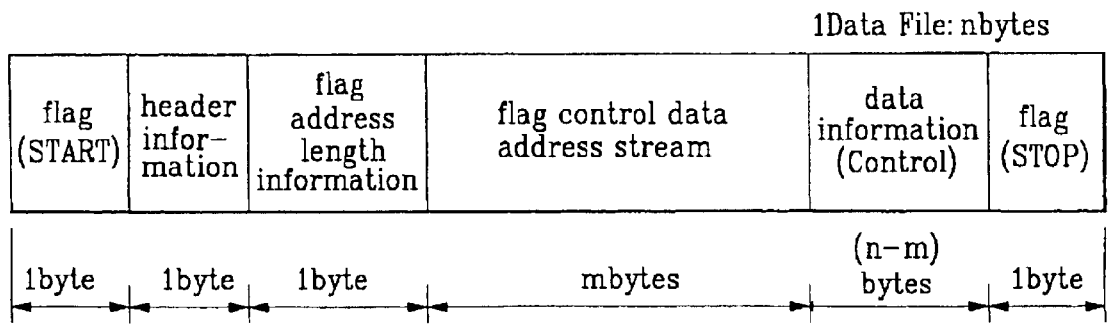
FIG. 6 shows a frame structure of a control data stream in an inventive embodiment.

FIGS. 5 through 10 containing FIGS. 10a and 10b depict the preferred embodiments in accordance with the present invention. In the frame structure of FIGS. 5 to 8 showing examples of the same data stream, FIG. 5 indicates a frame structure of an audio data stream, FIG. 6 shows a frame structure of a control data stream, FIG. 7 offers a frame structure of a video data stream, FIG. 8 furnishes a frame structure of a user data stream, FIG. 9 provides a frame structure provided when a receiving side requires a re-transmission of data information, FIG. 10a represents a frame structure provided when the receiving side requires a transmission of control data, and FIG. 10b sets forth a frame structure provided in case there is no the required data information.

As shown in FIGS. 5 and 6, in case that data information having the same nature is transmitted, header information put next to the start flag provides its file speciality to clarify its classification, and the flag address length information is added between the header information and the flag audio data address stream or the flag control data address stream, wherein the flag address length information represents a length, m bytes, of the flag audio data address stream positioned in the audio data address stream or the flag control data address stream, as a combination of 8 bits.

In the above header information, the mutually different codes according to each kind of files in the same data information such as the audio/video/control/user are provided by a combination of 8 bits, wherein the kind of files includes a case that one file is completed when successively received after a current packet, a case that a current packet is a completion of one file, and a case of a packet re-transmitted by a requirement of a receiving side, etc.

In FIGS. 7 and 8, the packet positional information to easily recognize a position of a packet is added between the header information and the flag address length information.

The packet positional information represents its packet number as a combination of 8 bits so that the receiving side easily finds out a packet position located in the frame, to whereby gain an execution of a re-transmission by transferring the corresponding packet information to the transmitting side in a case of a re-transmission requirement.

The data transmission protocol of the inventive image communication device under such structure is described referring to FIGS. 4 through 10, as follows.

With reference with FIG. 4, the start and stop flags for informing of a start and a completion of each frame are respectively provided as the flag data '10000001'($81_{HEC}$) made of a 1 byte combination so as to utilize a data usage range of '00000000~01111111($0$–$7F_{HEC}$)'.

That is, if the frame 1 packet is restricted to the maximum 128 bytes, the start and stop flags can be used by selecting one out of digits larger than 128($80_{HEC}$), and the receiving side transfers the flag data to the controlling part.

Further, in the header information, a combination of 8 bits capable of performing a role of an identifier for identifying a nature of the data information such as the audio/video/control/etc. is provided every the respective data under a state of representing identification codes differently, mutually.

The identification codes are selected as mutually different values among values larger than 10000001($81_{HEC}$), to thus achieve a division of the flag data and the data information as the audio/video/control/etc.

The flag data address stream has the address pointers of the same data as each 8 bits combination in order to prevent the flag data and the same data from being restricted to the data information.

If data same as the flag is put in the data information as the audio/video/control/etc. by 10 bytes, its respective address pointers are designated by the 8 bits combination in their respective positions, and this combined information of the respective 8 bits is successively arrayed, as an array stream. Then, the flag data address stream becomes 10 bytes.

The data information contains data of the audio, the video, the control, etc., and that data is transmitted for the rest data excepting data same as the flag data '10000001'.

This results in that the receiving side reads only the respective address pointers of the flag data address information so as to recognize it as data positioned in the corresponding address of the data information such as the audio/video/control/etc.

Also, if the data information as the audio/video/control/etc. is over '01111111($7F_{HEC}$)' of the threshold, an identifier as '11110000($F0_{HEC}$)' is put, and next, a based value as '10000000($80_{HEC}$)' is put. And then, 'F0' is put one by one to thereby ensure the maximum value through a carry.

If they are represented as 0 . . . 3E . . . 4F . . . 7F(F0)07 09 . . . (F0) . . . as its example, the first F0 is an initial carry, thus $07_{HEC}$ becomes (10000111) and $09_{HEC}$ becomes 89(10001001). Also a second F0 is a second carry, thus $90_{HEC}$(10010000) is provided as the based value.

FIGS. 5 and 6 indicate embodiments of the invention, and show a frame structure of an audio or control data information, and in the header information, only one data information out of the data information as the audio/video/control/etc. shown in FIG. 4 is transmitted. Therefore a file characteristic for its data information, the audio/video, is classified by mutually different codes.

That is, in its files' characteristic, there are a case that one file is completed after consecutively receiving packets next to a current packet, a case that a current packet is represented as a completion of one file, and a packet re-transmitted by a requirement of the receiving side, etc. For these classified characteristics, they are shown by mutually different codes under a value larger than '$81_{HEC}$', to thereby distinguish it from the flag data.

In the flag address length information added between the header information and the flag audio data address stream as shown in FIG. 5, or between the header information and the flag control data address stream as shown in FIG. 6, a length for the flag audio data address stream or the flag control data address stream is indicated as a combination of 8 bits.

In other words, in case that the flag audio data address stream or the flag control data address stream is 10 bytes, each flag address length information is represented as '000001010($0A_{HEC}$)', and in case that there is no data same as the flag data in the data information, audio/video, the respective flag address length information becomes '0'.

Further, in the flag audio data address stream or the flag control data address stream, an address pointer for data same as the flag data, among the data information as the audio/video, is respectively represented as a combination of 8 bits, as given bytes, namely m bytes, successively by the number of bytes.

As its example, in case the data information, the audio/video, contains 10 data same as the flag data, the pointer addresses corresponding to the 10 data are each indicated as a combination of 8 bits, in due sequence, and its size is 10 bytes.

The data information as the audio/video has a size, n–m bytes, which is gained after removing by a size of the flag audio data address stream or the flag control data address stream from the total bytes, n.

FIGS. 7 and 8 provide embodiments of the invention by a frame structure of video or user data information. Herewith, packet positional information additionally sent between the header information and the flag address length information represents a packet No. positioned within 1 frame of the data information as the audio/video as a combination of 8 bits.

That is, in case a user indicates a usable data area, its data area is represented as a combination of 8 bits for an nth packet No. within 1 frame, so that the receiving side can easily find it out.

The receiving side easily knows a position of a transmitted file since the packet positional information is indicated like this, and in a case of a re-transmission requirement, the packet information is transferred to the transmitting side so as to perform the re-transmission.

At this time, the 1 packet size can be determined as 256 bytes or 512 bytes when the transmitting side decides a size of one packet, thus a memory can be managed conveniently.

The respective address pointers of data corresponding to the flag data in the data information of the video/user are consecutively arrayed by a combination of 8 bits, in the flag video data address stream or the flag user data address stream.

FIG. 9 sets forth an inventive embodiment in a frame structure provided when the receiving side requires a retransmission of the data information. As shown in FIG. 9, the header information is sent next to the start flag, and the packet positional information is sent next to the header information, and the flag address length information is also sent next to the packet positional information. To its next, a file for a retransmission, namely the flag data address stream, is put, and then, the data information such as the audio/video/control/etc. is put, and finally the stop flag is positioned.

FIGS. 10a and 10b show embodiments of the invention. As shown in FIGS. 10a and 10b, in case the receiving side requires a retransmission of control data information, it informs of what kind of the control data should be re-transmitted from the transmitting side, by using the header information.

That is to say, its retransmission requirement to the transmitting side is attained by only the start and stop flags and the header information positioned therebetween.

As shown in FIG. 10b, in case there is no corresponding data when the transmitting side receives a retransmission requirement, its transmission is gained by a frame structure made up of only the start and stop flags and the header information positioned therebetween.

In other words, in case there is no data to be re-transmitted, the information for informing of no-transmission data is transmitted by only the header information provided between the flags which informs the start and the completion.

As afore-mentioned, the receiving side can perform a file search more easily, since a nature of data, namely audio, video, etc., and a segmented file size, etc. are previously defined before the transmission.

In accordance with the present invention, as above-mentioned, in a protocol for shortening a MODEM connection time, overhead data in the MODEM is eliminated to increase a transmission efficiency per unit time, a loss of an image based on an improvement of a communication speed is lessened, namely as a reduction of a block influence in decompressing the image by lowering a compression ratio, under a frame structure in which a receiving side can easily execute a search of mutually different data information and data packet, and further, a program management becomes simple and a size of a memory is reduced by lessening a complication of a program.

It will be apparent to those skilled in the art that various modifications and variations can be made in the data transmission protocol of the image communication device of the present invention without deviating from the spirit or scope of the invention. Thus, it is intended that the present invention cover the modifications and variations of this invention provided they come within the scope of the appended claims and their equivalents.

What is claimed is:

1. A data transmission protocol of an image communication device comprising:
   data information for substantially indicating audio/video/control data in a file;
   start and stop flags for informing a start and a completion of the file, respectively;
   header information for discriminating a nature of the data information; and
   flag data address stream containing an address pointer indicating same data as the start and stop flags in the data information.

2. The data transmission protocol of claim 1, wherein in said start and stop flags, a flag pattern for a distinction between files is selected as one out of digits larger than '1000000($80_{HEC}$)', said flag pattern being a combination of 8 bits.

3. The data transmission protocol of claim 2, wherein in said start and stop flags, a data usage range is in "0~7F" by using '10000001($81_{HEC}$)' as a digit larger than $128_{DEC}$.

4. The data transmission protocol of claim 1, wherein in said header information, 8 bits are combined to discriminate a nature of data as audio/video/control/user data, and the header information is respectively represented as mutually different codes in order for an easy recognition of the respective data, and also, in transmitting the data information based on the same nature, a characteristic of files for the respective data information is subdivided and the data is transmitted by the mutually different codes.

5. The data transmission protocol of claim 4, wherein in said header information, 8 bits of the mutually different codes are combined so as to easily distinguish a nature of the mutually different data and files' characteristic of the same data, and its codes are respectively designated among digits larger than $80_{HEC}$.

6. The data transmission protocol of claim 1, wherein in said flag data address stream, an address pointer for its respective data is combined by 8 bits to attain consecutively optional bytes, in case that there is data same as the start and stop flags among data of the data information.

7. The data transmission protocol of claim 6, wherein in said flag data address stream, the address pointer for its respective data is combined by 8 bits to gain consecutively optional bytes, in case that there is data same as '10000001' among data of the data information.

8. The data transmission protocol of claim 1, wherein an area between the start and stop flags is provided with the header information which indicates information concerned with no-data, in case there is no corresponding data when a transmitting side receives a re-transmission demand.

9. The data transmission protocol of claim 1, wherein in said data information, only data excepting the data same as the flag data '10000001' is transmitted, and if positional information of the respective data is over '01111111($7F_{HEC}$)' as a threshold, an identifier as '11110000($F0_{HEC}$)' is put and a based value as '1000000($80_{HEC}$)' is put next to the identifier; and if the positional information of the respective data is over the based value, the identifier is put on that position again by one time.

10. The data transmission protocol of claim 1, wherein data 1 byte of the data information is transmitted as data combined with 8 bits in a non-protocol system.

11. The data transmission protocol of claim 1, wherein in said start and stop flags, a data usage range is set in "0~7F" by using '10000001($81_{HEC}$)' as a digit larger than $128_{DEC}$.

12. The data transmission protocol of claim 1, wherein in said header information, 8 bits of mutually different codes are combined so as to easily distinguish a nature of the mutually different data and files' characteristic of the same data, and its codes are designated among digits larger than $80_{HEC}$.

13. The data transmission protocol of claim 1, wherein in said flag data address stream, the address pointer is combined by 8 bits to gain consecutively optional bytes, in case that there is the data same as '10000001' among data of the data information.

14. The data transmission protocol of claim 1, wherein in said data information, only data excepting the data same as the flag data '10000001' is transmitted, and if positional information of the respective data is over '01111111($7F_{HEC}$)' as a threshold, an identifier as '11110000($F0_{HEC}$)' is put and a based value as '1000000($80_{HEC}$)' is put next to the identifier; and if the positional information of the respectively data is over the based value, the identifier is put on that position again by one time.

15. The data transmission protocol of claim 1, wherein in case that said data information is the same data as the audio, the video, the control or a user data, said data information has a frame structure wherein flag address length information is added between the header information and boundary identification positional information, said flag address length information representing a length of the boundary identification positional information positioned in a data stream by a combination of 8 bits.

16. The data transmission protocol of claim 1, wherein positional information represented as a combination of 8 bits is added between the header information and boundary identification information length so as to easily search a position of a packet.

17. The data transmission protocol of claim 1, wherein said same data is transmitted to a frame structure where an area between said start and stop flags is provided with the header information which indicates only required data, in case a receiving side requires a re-transmission of the same data.

* * * * *